Oct. 23, 1962   W. A. CHAPPELL ETAL   3,059,332
AUTOMATIC POWER OPERATED CAN OPENER
Filed Nov. 14, 1960   5 Sheets-Sheet 1
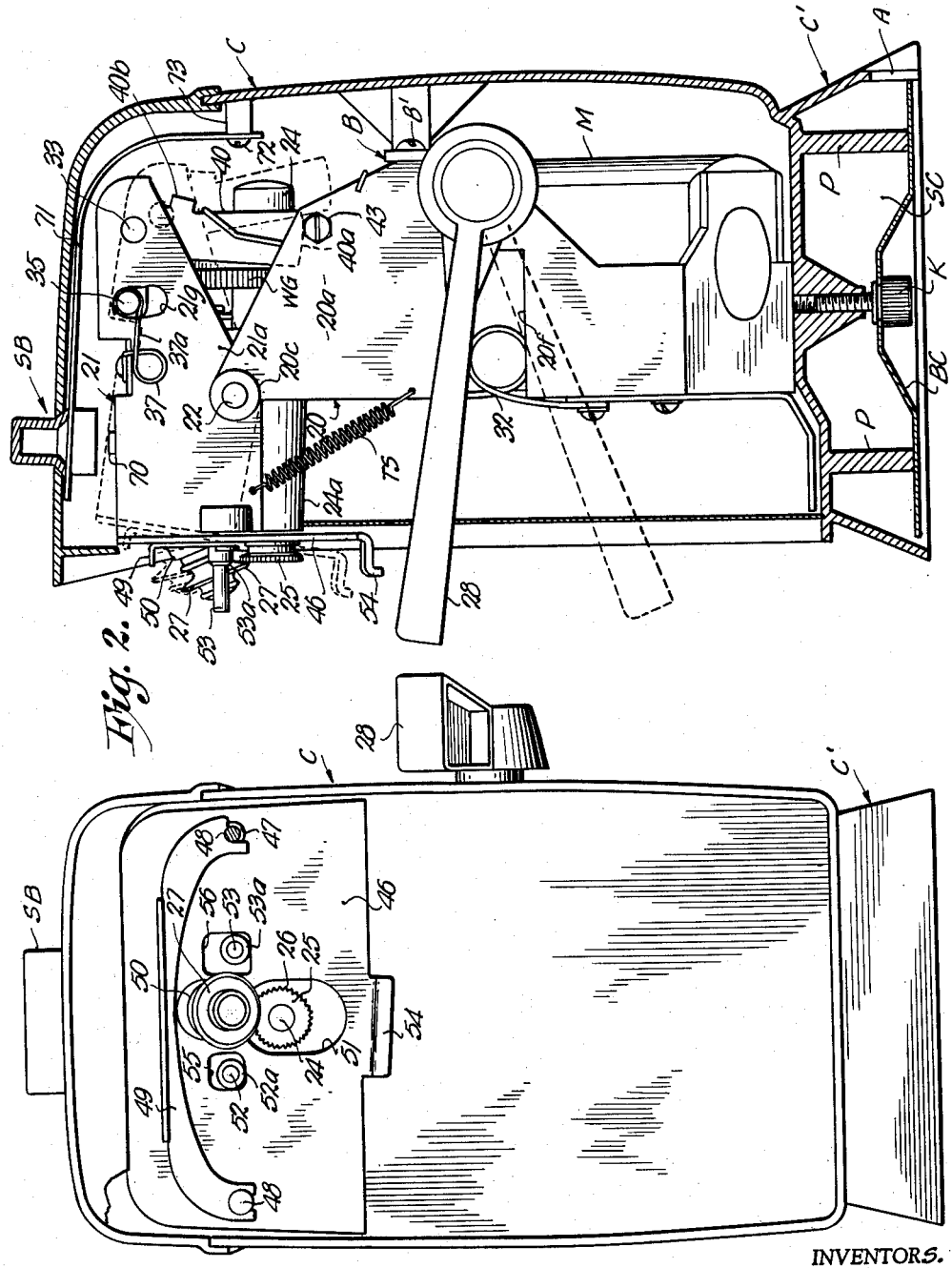
INVENTORS.
William A. Chappell
Robert E. McLean
BY
ATTORNEY.

INVENTORS.
William A. Chappell
Robert E. McLean
BY
ATTORNEY.

Oct. 23, 1962   W. A. CHAPPELL ETAL   3,059,332
AUTOMATIC POWER OPERATED CAN OPENER
Filed Nov. 14, 1960   5 Sheets-Sheet 3
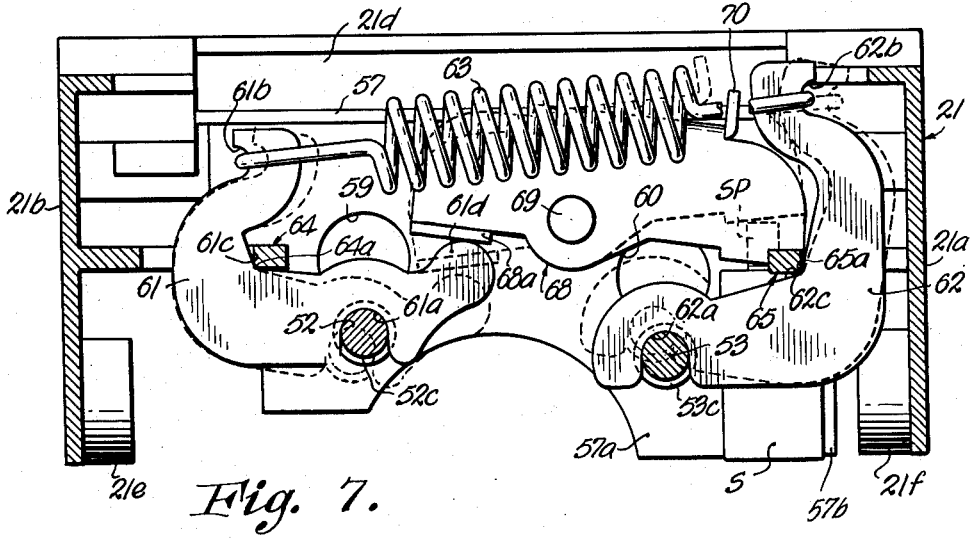
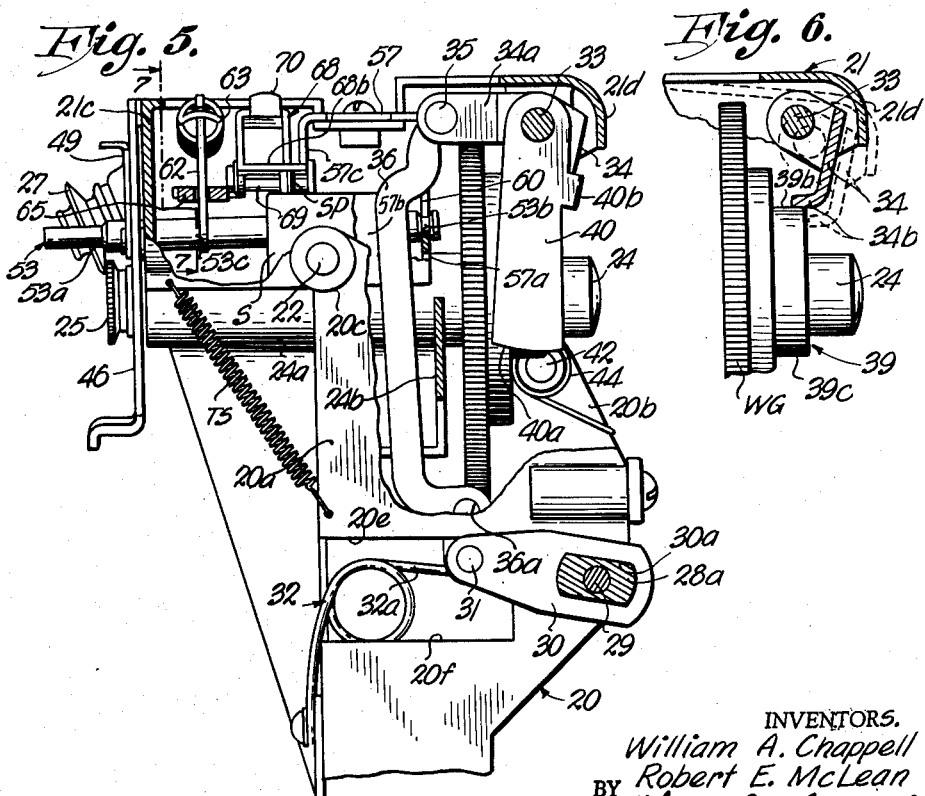
INVENTORS.
William A. Chappell
Robert E. McLean
BY
ATTORNEY.

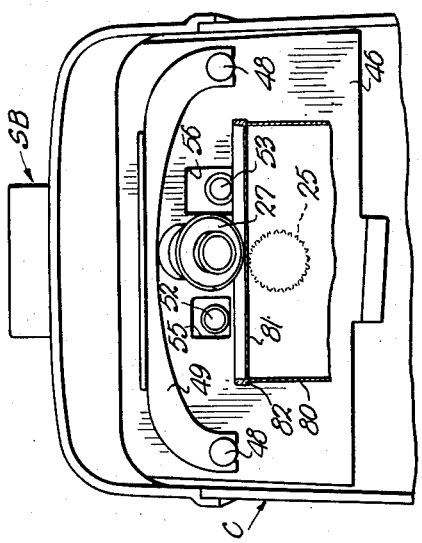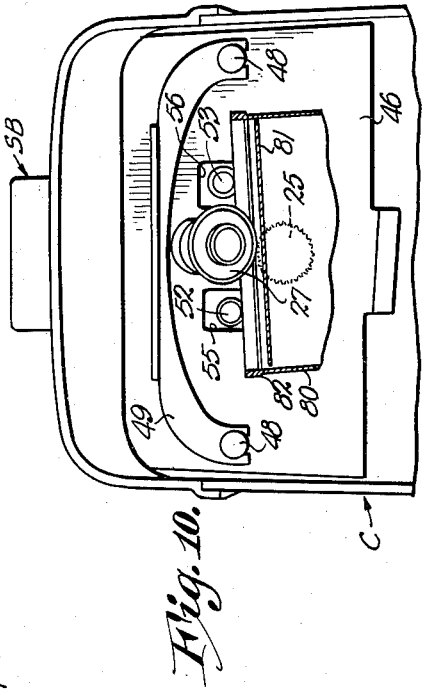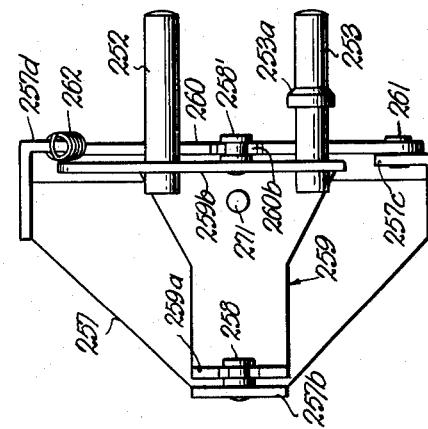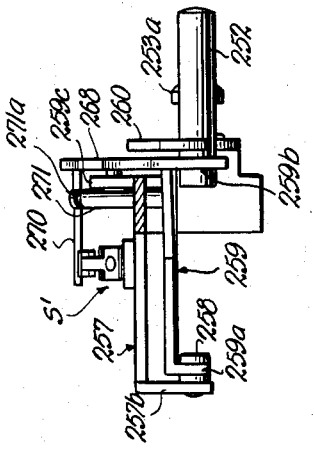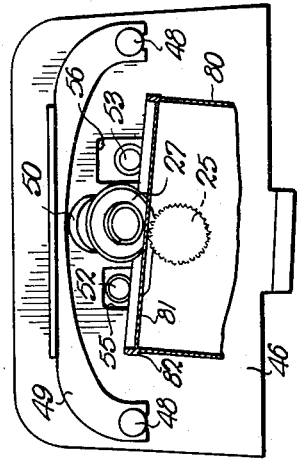

Oct. 23, 1962 W. A. CHAPPELL ETAL 3,059,332
AUTOMATIC POWER OPERATED CAN OPENER
Filed Nov. 14, 1960 5 Sheets-Sheet 5

INVENTORS.
William A. Chappell
Robert E. McLean
BY
*Thos. E. Scofield*
ATTORNEY.

United States Patent Office 3,059,332
Patented Oct. 23, 1962

3,059,332
AUTOMATIC POWER OPERATED CAN OPENER
William A. Chappell and Robert E. McLean, Raytown, Mo., assignors to John C. Hockery, trustee for Henry J. Talge and Foster L. Talge, Kansas City, Mo.
Filed Nov. 14, 1960, Ser. No. 68,861
20 Claims. (Cl. 30—4)

This invention relates generally to power operated can openers and refers more particularly to an improved can opener of this type having novel power piercing and can shearing control mechanism.

One of the principal objectives of the invention is to provide an electrically powered can opener in which the entire can opening operation, from piercing of the end of the can through the completion of the severance of the end from the can, is accomplished through the momentary manipulation of but a single manual control element easily accessible to the operator. Among the features of the invention in this respect are that once the can is preliminarily positioned in the device, the operator is relieved of any necessity for further holding the can to guide it during piercing or shearing; the shearing operation ceases immediately upon completion of shearing; and the can remains firmly supported in an upright condition following severance of the end from the can and will remain there until removed by the operator.

Another important object of the invention is to provide a unique motor control mechanism which automatically governs the state of the motor (i.e., energized or deenergized) in response to the forces imposed upon the can body during the shearing operation and the change in these forces at completion of shearing. Stated otherwise, it is one of the purposes of the invention in this respect to provide a can opener which has automatic means that serve to maintain the motor energized at all times during the cycle of opening the can until the end has been completely sheared from the can, and which serve to deenergize the motor upon the completion of the shearing.

A further object of the invention is to provide a motor control mechanism having the objectives above defined wherein the can body is maintained at all times during the shearing operation in firm tractive engagement with the feed wheel, and in which the means for accomplishing this also serves the purpose of continuously sensing the condition of the can by reflecting the shearing forces being imposed thereon by the cutter and feed wheel and translating them into a positive control for the motor. In pursuance of this objective, the preferred embodiment of the invention provides for two laterally spaced can guide members which engage the rim or flange of the can on opposite sides of the feed wheel and which are so biased with respect to the can and related to one another as to shift relative to one another and with the can as the forces on the can resulting from shearing are relieved at the completion of shearing, the change in position of the can guide members effecting control over the state of the motor.

Still another object of the invention is to provide a motor control mechanism which in no way interferes with, restricts or hampers manual manipulation of the single control element at the election of the user.

A further object of the invention is to provide a can opener of the character described in which the power piercing of the end of the can is accomplished through only momentary depression of the manual control element, piercing taking place within a predetermined increment of the initial rotation of the feed wheel, and in which means are provided for holding the cutter in cutting relationship with the can during the remaining shearing cycle without, however, interfering in any way with the automatic control over the motor by the motor control mechanism.

Yet another object of the invention is to provide a can opener of the character described which is provided with means for detachably mounting the cutting element to the can opener so that the cutter element can be removed without tools, cleaned and replaced, all without any possibility of altering the critical orientation of the cutter element relative the feed wheel.

Other and further objects of the invention together with the features of novelty appurtenant thereto will appear in the course of the following description.

In the accompanying drawings which form a part of the specification and are to be read in conjunction therewith, and in which like reference numerals indicate like parts in the various views;

FIG. 1 is a front elevational view of a complete can opener embodying a preferred form of the invention;

FIG. 2 is a side elevation taken from the right hand side of FIG. 1, the casing having been broken away and shown partly in section in order to expose the interior working mechanism;

FIG. 5 is an enlarged fragmentary view of the upper portion of the unit taken from the same side as FIG. 2, but with the near side of the casing, support frame and tilting head broken away to expose the internal structure;

FIG. 6 is a fragmentary sectional view taken generally along the line 6—6 of FIG. 4 in the direction of the arrows;

FIG. 7 is an enlarged fragmentary sectional view taken generally along the line 7—7 of FIG. 5 in the direction of the arrows;

FIG. 8 is a fragmentary front elevation on a reduced scale of the front of the can opener illustrating a can in place before piercing has occurred;

FIG. 9 is a view similar to FIG. 8, but showing the position of the can and the relationship of the can cutter wheel, can feed wheel and associated can guide members during the can severing phase of the operation;

FIG. 10 is a view similar to FIGS. 8 and 9, but showing the position of a can, the severed can lid and associated can guide members after severing of the can lid has been completed and the unit automatically shut off;

FIG. 14 is a fragmentary sectional view, on a reduced scale, taken generally along the line 14—14 of FIG. 12 in the direction of the arrows, the support bracket being disassociated from the tilting head, both the upper and lower springs having been removed to show the structure more clearly; and FIG. 15 is a bottom plan view of the sub-assembly shown in FIG. 14.

Figure 3:
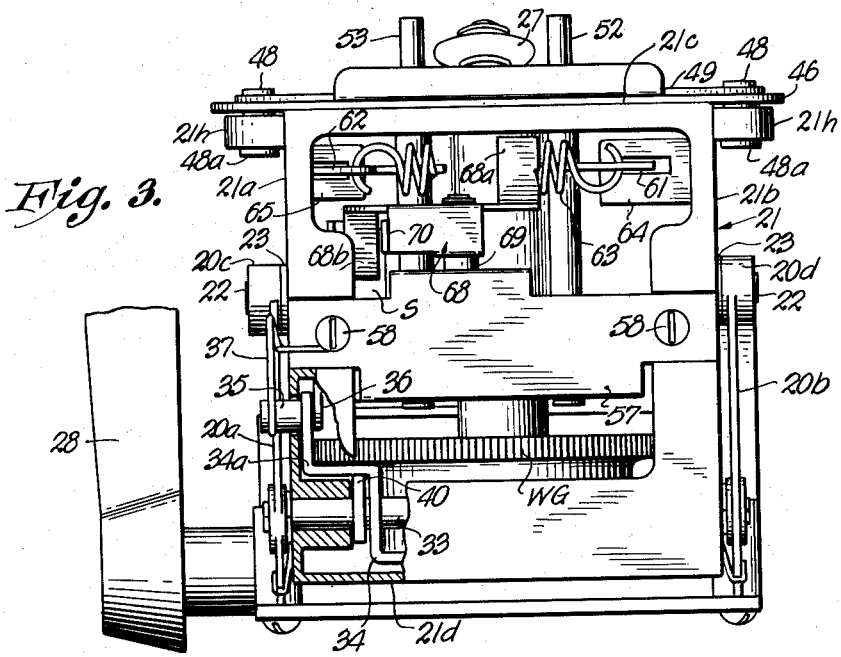
FIG. 3 is a top plan view of the can opener with the top portion of the casing and projecting hand switch removed, parts being broken away for the purposes of illustration.

Referring now to the drawings and initially to the preferred embodiment of the invention disclosed in FIGS. 1–10, inclusive, the can opening unit herein shown is a table model in which substantially all of the mechanism is housed in an upright shell or casing C. The casing may be composed of plastic or other suitable material. It has the hollow base C' adapted to rest on a table, counter top or other flat surface. The bottom of the base is covered by a base cover plate BC which defines with the interior of the base an electric cord storage compartment SC. An aperture A permits egress of the electric cord (not shown) from the base and internal posts P provide a winding support for excess cord. The base cover BC is held to the base by the knurled head screw K.

Extending upwardly inside the casing from the base and supported therein as by bracket B and screws B1 is the motor carrying and tilting head supporting frame 20. The frame terminates at its upper end in the parallel vertical side plates 20a and 20b. Disposed partially above and supported between side plates 20a and 20b is the tilting head 21 having the spaced sides 21a and 21b and connecting front and rear walls 21c and 21d, respectively. The tilting head is supported for limited pivotal movement about a horizontal axis defined by a pair of aligned trunnion pins 22 which are received in a rotatable fit through corresponding aligned apertures (not shown) in bosses 20c and 20d formed on the side plates 20a and 20b and bosses 21e and 21f on the adjoining sides of the tilting head. Pins 22 are retained against longitudinal movement by snap rings 23 which engage in corresponding annular grooves (not shown) in the pins.

Diagonally mounted on the body or frame 20 is the electric motor M having a drive shaft terminating in a worm W. The motor M, through its worm W, drives the worm gear WG. The worm gear WG serves in turn to drive the feed wheel drive shaft 24. The gear may be cast on the drive shaft or otherwise properly secured thereto. The shaft 24 is supported for rotation about its longitudinal axis in suitable fixed bearings 24a, the bearings being carried by the transverse support bracket 24b (see FIG 5) secured between the side plates 20a and 20b of frame 20. The forward end of shaft 24 has secured thereto the can feed wheel 25 which is provided with suitable teeth 26 that serve to penetrate the under edge of the rim or flange of a can in order to have adequate traction therewith for feeding of the can in relation to the cutter wheel 27. It will be understood that the assembled worm gear WG, can feed wheel drive shaft 24 and can feed wheel 25 are assembled so that the parts WG, 24 and 25 can have no longitudinal movement in the bearing.

The tilting head 21 is biased continually in a counter-clockwise direction, as viewed in FIG. 2, by a tension spring TS having its ends connected respectively with the forward portion of the side 21a of the tilting head 21 and side plate 20a of the frame 20. Counterclockwise movement of tilting head 21 about trunnions 22 is limited to the solid line position of FIG. 2 through interengagement of the lower edge of the forward portion 21c of the tilting head with the top of bearing 24a.

As will be explained in greater detail at a later point herein, the tilting head 21 serves to carry the cutter wheel 27 and is operable to lift the cutter wheel to the upper position shown in broken lines in FIG. 2 to permit insertion of a can flange between the feed wheel 25 and cutter wheel. This is accomplished by shifting or tilting the tilting head 21 to the broken line position of FIG. 2, the shift being accomplished through depression of a can release lever 28 located to one side of the casing C.

The can release lever 28 is mounted for limited pivotal movement on the support frame 20 by a suitable shoulder screw 29 that is threaded into a tapped aperture in the frame 20. The inner end of the can release lever 28 is provided with a tenon portion 28a of non-circular cross section that extends through an opening 30a of corresponding cross section provided in a crank arm 30 so that the crank arm 30 rotates with the can release lever 28 at all times. The can release lever is also provided with a round portion 28b that extends between the tenon portion 28a thereof and the outer hub portion 28c. Round portion 28b of the can release lever extends through a suitable aperture formed in the case or housing C. The crank arm 30 carries at its outer end the transverse shoulder rivet 31. Clockwise rotation of the can release lever is limited by engagement of shoulder rivet 31 with the upper edge surface 20e of an opening in the frame 20. Counterclockwise rotation of the can release lever is limited by engagement between the shoulder rivet 31 and the edge surface 20b of the same opening. A torsion spring 32 is provided with a free terminal portion 32a which underlies and serves to urge shoulder rivet 31 upwardly so as to yieldably maintain the can release lever 28 in its extreme clockwise position (as viewed in FIGS. 2 and 5). Pivoted on a pin 33 carried by the tilting head 21 at a point substantially rearward of the trunnions 22 is a swivel member 34. As shown in FIG. 3 this swivel member 34 has an offset forwardly extending portion 34a through which extends a shoulder rivet 35 that is anchored in the upper end of a downwardly extending link 36. Shoulder rivet 35 extends through a suitable aperture 21g formed in the adjacent side wall 21a of the tilting head 21. Aperture 21g is elongate in the vertical direction and serves to limit the amount of rotation of swivel member 34 on pin 33 in relation to the tilting head 21. Another torsion spring 37 has a terminal portion 37a underlying rivet 35 and biases the rivet 35 toward the upper end of aperture 21g, this corresponding to the extreme clockwise position of the swivel member 34 as viewed in FIGS. 2 and 5. The rivet 31 on crank 30 extends through the opening 20e–20f in the frame and into a vertically elongate slot 36a in the lower end portion of link 36.

It will now be seen that swivel member 34 is coupled with the can release lever 28 through the medium of the vertical link 36 and the crank arm 30. Depression of the can release lever 28 will result in counterclockwise rotation of the swivel member 34 (when the parts are in the solid line positions as viewed in FIG. 2, or corresponding positions as viewed in FIG. 5). However, by reason of the elongate slot 36a provided in the lower end of link 36 it will be obvious that the spring 32 will immediately return the crank arm 30 and can release lever 28 to the extreme clockwise (or raised) position as soon as downward force is removed from the free end of the can release lever, even though the swivel member 34 should remain in its extreme counterclockwise position or in any other position between its extreme counterclockwise position and its extreme clockwise position.

Figure 4:
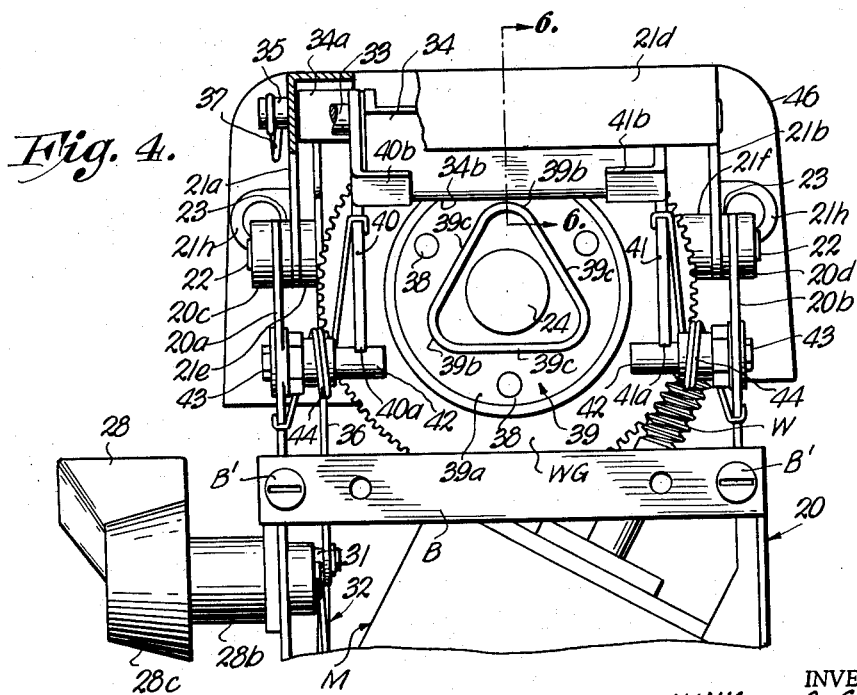
FIG. 4 is a fragmentary rear elevational view of the upper portion of the unit, the casing again not being present, and parts being broken away for purposes of illustration.

As seen in FIGS. 4 and 6, the swivel member 34 is provided with a flat inturned horizontal portion 34b located substantially below its pivot axis 33. As will subsequently be seen, at all times while the end of a can engaged in the can opener is being pierced by the cutter wheel and the end is being sheared from the can, this portion 34b of the swivel member will be in the position shown in solid lines in FIG. 6. Also, the portion 34b will continue in such position (even though the end has been completely sheared from the can and the motor is stopped) until the user depresses the can release lever 28 to remove the can from the device.

Secured to the worm gear WG by rivets 38 or other suitable means is the can piercing cam 39 here shown as provided with a mounting flange 39a and with three lobes 39b separated by straight surfaces 39c. Obviously, the can piercing cam 39 can be in any form providing a surface eccentric to the axis of the can feed wheel drive shaft 24. However, to effect the piercing of the end of a can engaged in the can opener after a minimum rotation of the can feed wheel, a cam substantially as shown having three lobes has been found very satisfactory. It will be observed that when the swivel member 34 is in its normal or extreme clockwise position (as viewed in the solid lines of FIG. 6) the portion 34b thereof is in the plane of potential engagement with the lobes 39b or surfaces 39c of the can piercing cam 39, depending on the rotational position of the latter.

In FIGS. 4 and 5 and in the solid lines of FIG. 6, the swivel member 34 and tilting head 21 are shown in the positions they occupy when the cutter wheel 27 is in the overlapping cutting relationship with the feed wheel 25; in other words, when the can lid has been completely pierced or when the unit is not being used. The broken lines of FIG. 6 show the resulting position of the swivel member 34 and one of the possible positions of the can piercing cam after a user has inserted a can in the can opener and then removed downward pressure on the can release lever, thus permitting the spring TS to rotate the tilting head 21 counterclockwise (as viewed in FIGS. 2 and 5) until the rim or flange of the can firmly seats downwardly on the periphery of the feed wheel and the edge of the cutter wheel firmly seats downwardly on the as yet unpierced end of the can. In this condition the can is firmly held by the can opener and the user need not continue holding the can. The condition described is illustrated in FIG. 8.

It will be understood that when the user fully depresses the can release lever 28 in order to permit insertion of the can between the feed wheel and cutter wheel, the swivel member 34 will actually be rotated slightly more counterclockwise than the position shown in broken lines in FIG. 6, and the tilting head 21 will be rotated clockwise to its extreme position (as best seen in FIG. 2) in which position the cutter wheel 27 carried thereby will be vertically separated from the underlying can feed wheel sufficiently to permit insertion or removal of the can in the device. FIG. 6 in the broken line illustrates the relative positions of the head 21 and swivel 34 when the can lever 28 has been released and the cutter has moved into engagement (but not through) the lid as previously explained.

From the description thus far, it should be evident that when the tilting head 21 is in its extreme clockwise position (as viewed in FIG. 2) and any one of the flats 39c of the can piercing cam is in parallel alignment with the inturned portion 34b of the swivel member 34, the latter will be in a vertical plane sufficiently above that of the parallel flat 39c to permit the spring 37 to effectively and easily rotate swivel member 34 clockwise to its extreme position in which the portion 34b thereof will be in vertically overlying relationship with the cam, and thus in a position to be engaged from below by the advancing lobe 39b of the cam and forced upwardly. The upward force is, of course, transmitted to the tilting head 21 with the result that the tilting head is moved in a direction to drive the cutter wheel 21 downwardly into its overlapping cutting relationship with the feed wheel 25 and thereby pierce the lid of the can.

The maximum radial dimensions of the cam lobes 34b with respect to the axis of shaft 24 are such that the engagement between a cam lobe and portion 34b of the swivel member will be broken slightly before the tilting head 21 reaches the extreme counterclockwise position previously described, that is, with the lower edge of the front portion 21c in engagement with the bearing 24a. In order to hold the tilting head in its "down" or can shearing position during operation of the device, we have provided a pair of holding pawls which are designated by the reference numerals 40 and 41, respectively. Each of these pawls is pivoted at its upper end for limited rotational movement on the pin 33 and is interposed between pin support portions of the tilting head 21 and the adjacent connections between the swivel member 34 and the pin. Each pawl is suitably cammed at its lower end as at 40a or 41a so that a greater distance exists between its pivotal axis and its lower rear corner than between its pivot axis and its lower forward corner. Each pawl is provided with an inturned lug 40b or 41b for engagement by a portion of the swivel member 34 whenever the swivel member is rotated counterclockwise, as viewed in FIG. 5. Accordingly, whenever the swivel member is rotated counterclockwise (again as viewed in FIG. 5) the pawls 40 and 41 will be rotated therewith.

The lower ends 40a and 41a of pawls 40 and 41 cooperate at times with horizontal pins 42, one for each pawl, disposed therebelow. The pins 42 are mounted on adjacent wall portions of the body 20 by screws 43 or other suitable means. Coiled about each pin 42 is a torsional spring 44 with one leg of the spring seating against the edge portion of the wall of the body 20, while the other leg thereof seats against the rearward edge of its corresponding pawl. The bias of these springs is such as to urge the pawls 40 and 41 to rotate clockwise, as viewed in FIG. 5, at all times.

Because of their interengagement with the swivel member 34, and because of the forward edges striking the pins 42, the pawls 40 and 41 will occupy the broken line position of FIG. 2 whenever the tilting head 21 is in the tilted or clockwise position shown in broken lines in FIG. 2. However, once the head 21 returns to a position at which the lower edges 40a and 41a of the pawls begin to clear the upper surface of pins 42, the springs 44 serve to rotate the pawls back to approximately the solid line position shown in FIG. 2, which position is also shown in FIG. 5. By referring to FIG. 5, it will be seen that the springs 44, in effect, wedge the pawls between the pin 33 and the underlying pins 42, thereby (until the can release lever 28 is next depressed by the user) maintaining the axis of pin 33 (and thus the rearward portion of the tilting head 21) the same distance above the axis of the pins 42 to which the tilting head is moved by a lobe 39b of the can piercing cam 39. The amount of camming of the lower ends of the pawls 40 and 41 is preferably sufficient to assure that this "wedging" will always occur before the pawls arrive at their extreme limit of clockwise rotation, as viewed in FIG. 5. However, the amount of camming or degree of curvature should not be so great that downward thrust imparted to the pawls at their connection with pin 33 during operation would cause them to rotate counterclockwise. In other words, the force component applied to the pawls 40 and 41 by pins 42 should be substantially aligned with pin 33.

Turning now to the forward end of the tilting head 21, the cutter wheel 27 is secured to the tilting head through the medium of a cutter mounting plate generally indicated by reference numeral 46. The plate 46 is of slightly greater width than the width of the tilting head and is provided with spaced apertures 47 (only one is shown in FIG. 1) adapted to register with and fit over spaced forwardly projecting pins 48 on either side of the tilting head. The pins 48 are provided with heads 48a at their rearward ends and are press fitted into sidewardly projecting lugs 21h integral with the tilting head. The pins 48 are provided with suitable annular grooves near their forward ends into which the two bifurcated ends of the cutter mounting plate retainer 49 are inserted to secure the cutter mounting plate in place on the tilting head. The retainer 49 is generally arch shaped, the central portion passing above the cutter wheel. The cutter mounting plate preferably bears rearwardly against the tilting head 21 only along its upper edge. To accomplish this a suitable leaf spring (not shown) is secured to the front of the tilting head 21 at a point below, but between the axes of the pins 48 to urge the bottom of the cutter mounting plate forwardly, thereby to maintain the cutter mounting plate firmly seated forwardly against its retainer 49, and the retainer in turn firmly seated forwardly in the grooves of the pins 48. The leaf spring, while not absolutely essential, allows for manufacturing tolerances and otherwise facilitates installation and removal of the cutter mounting plate 46 from the tilting head.

The cutter wheel 27 is carried by the mounting plate, the latter being provided with a suitable boss 50 to which the stub axle for the cutter wheel is secured. The mounting plate 46 is also provided with a suitable opening 51, providing the necessary clearance for the feed wheel shaft 24 and the feed wheel 25 mounted thereon. The opening 51 is of sufficient size to permit free movement of the tilting head without interference with the shaft or feed wheel between the limiting positions of the tilting head. Located on the mounting plate 46 below the opening 51 is a forwardly extending can guard 54 that, during operation, serves to engage the side of the can and maintain the can in a predetermined orientation relative to the plane of the face of the can feed wheel 25.

It will be noted that projecting forwardly on the opposite sides of the cutter wheel 27 are pin-like members 52 and 53. For the purposes of this application these will be denominated as can guides, reference numeral 52 being applied to the left-hand can guide, and 53 to the right-hand can guide.

The can guides 52 and 53 are relatively long rod-like members which originate within the tilting head 21 and extend outwardly through suitable openings in the forward portion 21c of the tilting head and the mounting plate 46. These openings are indicated at 55 and 56, respectively (see FIG. 1), it being understood that while the edges of the openings in the mounting plate only are seen in FIG. 1, there are like sized openings in the forward face 21c of the tilting head. For reasons which subsequently will appear, the openings 55 and 56 are large enough to permit limited vertical and sidewise movement of the can guides therein. The forward ends of the can guides are of reduced diameter providing chamfered shoulders 52a and 53a which are substantially in the same plane as the face of the feed wheel 25.

The rearward ends of the can guides 52 and 53 are supported within the interior of the tilting head 21 through their connection with the vertically depending rearward flange 57a of a bracket 57 which spans the top of the tilting head intermediate its ends and is secured thereto by screws 58 (see FIG. 3). The connection of the can guides with the flange 57a is such that the can guides are capable of limited universal pivoting relative the flange, the connection being established by annular grooves as at 53b on the rearward portions of the guides (see FIG. 5) which interfit with the edges of the narrow bottom portions of spaced keyhole shaped slots 59 and 60 in the depending flange 57a.

At a point intermediate the ends thereof, each of the two can guides 52 and 53 is provided with a second annular groove 52c or 53c in which the bifurcated portion 61a and 62a of the left and right bell crank type pivot arms 61 and 62 engage. These pivot arms (shown best in FIG. 7) are provided with notches 61b and 62b respectively, in which the ends hooks or loops of a tension spring 63 are engaged. At selected points between the notch for the spring loop and the axis of the can guide engaged in the bifurcated portion of the pivot arm, each pivot arm is provided with a sharp but obtuse inside corner 61c or 62c, as shown. The corners fulcrum the pivot arms 61 and 62 on the cooperating corners 64a and 65a of suitable left and right mounting brackets 64 and 65, respectively. The brackets 64 and 65 are made integral with or securely fastened to the sides of the tilting head.

In the arrangement presently being described (particularly as shown in FIG. 7) it will be observed that tension of the spring 63 causes the bell crank type pivot arms 61 and 62 to exert a downward pressure on the can guides 52 and 53, respectively, thus causing the forward ends of the can guides to seat downwardly in the respective openings 55 and 56 of the front wall 21c of the tilting head, through which they extend, at all times when a can is not engaged in the can opener. This same spring force, since it is applied to the can guides at points spaced axially rearwardly of the openings, serves to continuously seat the rearward ends of the can guides in the narrow portions of the keyhole slots 59 and 60. However, as will subsequently be seen, at all times when a can is engaged in the can opener and the end of same has been fully pierced by the cutter wheel 27, both can guides are unseated from the bottom of their respective openings 55 and 56, and they bear downwardly on the rim or flange on the can at points to the left and to the right of the axis of the underlying can feed wheel which is in engagement with the under edge of the rim or flange of the can. By virtue of its location between the respective can guides, the can feed wheel serves as a fulcrum for the rim or flange of the can. The amount of pressure exerted downwardly on the rim or flange of the can by the can guides 52 and 53 is such as afforded by predetermined tension of the spring 63. This pressure must be adequate to cause sufficient penetration of the teeth 26 of the can feed wheel into the under edge of the rim or flange of the can for effective traction and efficient feeding of the can by the can feed wheel in relation to the cutter wheel. More will be said later as to the lateral spacing of the can guides 52 and 53 from the feed wheel axis and the way in which these can guides function to control the operation of the motor M during operation of the unit.

The state of the motor M (energized or deenergized) is governed by a plunger switch S having the upstanding actuating plunger SP. The leads (not shown) of the switch are connected in series with the motor M. The plunger and contacts (not shown) of the switch are normally biased to the "open" or circuit breaking position. Depressing the plunger SP will close the contact points, thus starting the motor. However, when pressure is removed from the switch plunger SP, the contact points of the switch will open, thereby stopping the motor. The switch S is secured to a forwardly extending portion 57b which is formed integral with and at one end of the depending flange 57a of the bracket 57 previously described, and thereby is movable with and as a part of the tilting head 21.

Reference numeral 68 indicates a rocker arm which in effect serves as a switch actuating lever. The rocker arm is mounted for limited pivotal movement on a stud 69 which is anchored at one end to and projects forwardly from a depending flange 57c at the front edge of bracket 57. Preferably the rocker arm is of inverted U-shape in cross section at its point of connection with the pin in order to provide a strong support for the rocker arm. It is provided on the left end (as viewed in FIG. 7) with a forwardly extending foot portion 68a and on the right hand with a similar, but rearwardly extending foot portion 68b (see FIGS. 3 and 5). The forwardly extending foot portion 68a overlies and is adapted to be contacted by the arcuate right end 61d of the bell crank type can guide pivot arm 61. The rearwardly extending foot portion 68b overlies and is adapted to be contacted with and depress the switch plunger SP. Located on top of the arm, but offset from the stud 69 is an upstanding ear 70.

The ear 70 is positioned to be operated on by the depression of a manual switch button SB (FIG. 2) which is secured to the forward end of a leaf spring 71. One end of the spring is secured to the casing C as by screw 72 and spacer 73. The bias of the leaf spring 71 is such as to urge the switch button SB upwardly at all times. As shown, switch button SB extends upwardly through a suitable aperture in the top of the case C. Depressing the switch button SB will cause it to engage the ear 70 of the rocker arm 68 and the rearwardly extending foot portion 68b of the rocker arm will in turn depress the switch plunger SP to close the contact points of the switch S and start the motor M.

It is believed that better understanding of the details of construction and arrangement of some of the components will be obtained if we proceed at this point with a description of the operation of the unit shown in FIGS. 1 through 10.

Whenever the can opener is not being operated and a can is not engaged therein, all parts will assume substantially the position shown in FIGS. 1, 4 and 5, and the solid line position shown in FIG. 2.

The tension coil spring TS will maintain the tilting head 21 in its extreme counterclockwise position of rotation on its trunnions 22 as shown in FIG. 2 in solid lines. As previously stated, a portion of the front wall 21c of the tilting head 21 seats on an underlying portion of the bearings 24a to limit swinging of the tilting head 21 in the counterclockwise direction, as viewed in FIG. 2.

The spring 37 maintains the shoulder rivet 35, which is anchored in portion 34a of the swivel member 34, in its uppermost position in the arcuate slot 21g formed in the side wall of the tilting head 21. Therefore, the spring serves at this point to urge the swivel member 34 toward and in the solid line position shown in FIG. 6.

The torsion spring 32 maintains the can release lever 28 in its extreme clockwise position, as shown in solid lines in FIG. 2, in which position further clockwise rotation of the hand lever 28 is prevented by engagement of the shoulder rivet 31 with edge portion 20f in the opening of the body 20.

The torsion springs 44 each serve to maintain the pawls 40 and 41 rotated clockwise, as viewed in FIG. 2, on their pivot pin 33.

Also, the tension spring 63 (FIG. 7) maintains the forward ends of the can guides 52 and 53 seated downwardly in the openings of the front wall portion of the tilting head 21. The forward ends of the can guides 52 and 53, the can guide pivot arms 61 and 62, the switch actuating lever or rocker arm 68, and the switch plunger SP will be substantially in the broken line positions shown in FIG. 7. In this configuration the contact points of the switch S will be open.

To prepare the device for reception of a can to be opened, the user first depresses the can release lever 28 to its extreme counterclockwise position of rotation, as shown in broken lines in FIG. 2. This counterclockwise rotation of the can release lever 28 moves the link 36 downwardly. Inasmuch as the pawls 40 and 41 are seating downwardly on the pins 42, the initial downward movement of the link 36 causes the swivel member 34 to rotate counterclockwise, as viewed in FIGS. 5 and 6, until the lower cammed ends 40a and 41a escape from and clear the pins 42. As this happens the shoulder rivet 35 seats downwardly in the lower end of the opening 21g and establishes a driving connection between the link and the tilting head. Further downward movement of the link 36 causes clockwise rotation of the tilting head 21 to approximately the position shown in broken lines in FIG. 2. It should be noted that during the initial pivoting of the pawls 40 and 41, the lug portions 40b and 41b thereof are engaged with the swivel member which causes the necessary pivoting of the pawls. It will also be observed that the initial counterclockwise rotation of the swivel member 34 causes the forward edge of its inturned lip 34b to clear the rearward end of the can piercing cam 39 so that the swivel member can assume approximately the position shown in broken lines in FIG. 6.

Since the cutter mounting plate 46 is secured to the forward wall of the tilting head 21 it will be seen that full downward movement of the can release lever 28 swings the cutter wheel 27 upwardly from the solid line position to the broken line position, as viewed in FIG. 2, in which position sufficient vertical space exists between the periphery of the cutter wheel 27 and the periphery of the can feed wheel 25 to permit insertion of a can to be opened. It should be noted that as the cutter wheel 27 swings upwardly with the head, the forward ends of the can guides 52 and 53 will likewise swing upwardly from the solid line position shown in FIG. 2.

As the user holds the can release lever 28 fully depressed, the can to be opened is inserted in the can opener with the upper end of the can seating upwardly against the cutting edge of the cutter wheel 27, and the side wall of the can bearing against the can guard 54. When the can is in this position, the teeth of the can feed wheel 25 will be below the under edge of the rim or flange of the can. The user then removes his hand from the can release lever 28, thus permitting the spring 32 to return this lever to its uppermost position.

As the user removes his hand from the can release lever 28, the tension spring TS returns the tilting head 21 counterclockwise until the under edge of the rim or flange of the can seats firmly on the teeth of the can feed wheel and the cutting edge of the cutter wheel 27 seats firmly downwardly on the end of the can. At this stage of the operation of opening the can, the user may discontinue holding the can. The position of the can guides 52 and 53 and the relationship between the can 80 and can feed wheel and cutter wheel at this stage of the operation are shown in FIG. 8.

The user then depresses the switch button SB and holds same depressed until the end 81 of the can has been fully pierced by the cutter wheel 27. As the user depresses the switch button SB the latter will engage the upstanding ear 70 of the switch actuating lever or rocker arm 68, thus rotating the rocker arm clockwise, as viewed in FIG. 7, from the position shown in broken lines to the position shown in solid lines. Through the engagement of its foot portion 68b with the switch plunger SP, the plunger is depressed, thereby closing the switch contact points and starting the motor M. This in turn commences rotation of the feed wheel shaft 24 and the cam 39 secured thereto. If a flat 39c of the can piercing cam substantially parallels the cooperating inturned lip 34b of the swivel member 34 at the time the user permits the can release lever 28 to return to its uppermost position, the spring 37 will rotate the swivel member 34 to its extreme clockwise position, as shown in solid lines in FIG. 6, so that the lip will be in the path of advance of a lobe 39b. When in such proper plane, it will be obvious that the first approaching lobe 39b will engage the lip 34b of the swivel member 34 and move same upwardly, thus rotating the tilting head 21 to the solid line position shown in FIG. 2. However, should any lobe 39b of the can piercing cam be in such position at the time the user permits the can release lever 28 to return to its uppermost position as to prevent the spring 37 from rotating the swivel member 34 to its extreme clockwise position, one of the flats 39c of the can piercing cam will, during initial rotation of the can piercing cam, sufficiently parallel the cooperating lip 34b of the swivel member to permit the spring 37 to then rotate the swivel member to its clockwise position and place the lip 34b in the path of a lobe.

As the rearward end of the tilting head 21 is moved upwardly by one of the lobes 39b of the can piercing cam, the springs 44 will rotate the pawls 40 and 41, respectively, clockwise on their pivot pin 33 in such manner that the cammed lower end surfaces 40a and 41a of the pawls will cause the pawls to be "wedged" between the axis of their pivot pin and the underlying cooperating pins 42. The camming action of the pawls 40 and 41 is such that the pawls serve to maintain the rearward end of the tilting member 21 at the height to which it is raised by a lobe 39b of the can piercing cam. However, as earlier noted, the curvature of the ends 40a and 40b is flat enough that downward thrust on the pawls 40 and 41 occurring during the can shearing operation will not operate to dislodge the cammed ends from the "wedged" position.

As the tilting head 21 is rotated counterclockwise on its trunnions by the can piercing cam 39 the cutter wheel pierces the end of the can and moves into its overlapping can shearing relationship with the feed wheel 25. Inasmuch as the cutter wheel is supported on the cutter mounting plate 46 intermediate its two mounting pins 48, the plate will flex as required to permit the necessary increase in the normal lateral spacing as viewed in FIG. 5 between the overlapping portions of the cutter wheel 27 and the can feed wheel, as when the additional thickness of the side seam of a can is passing between the overlapping portions of these two parts.

As the cutter wheel descends through the lid of the can, the forward ends of the can guides 52 and 53 will be engaged by the top of the rim or flange of the can and unseated from the bottom of the openings 55 and 56. As is evident from FIG. 7, the upward displacement of the can guides is resisted by spring 63 and consequently the spring causes the can guides to exert downward pressure on the rim or flange of the can which drives the lower edge 82 of the rim against the teeth of the feed wheel to assure positive traction between the feed wheel and can.

The lengths of the effective moment arms between the spring connection with the bell crank levers 61 and 62 and the fulcrum points 64a and 65a, between the latter and the guides 52 and 53, respectively, and between the fulcrum point for the can on the feed wheel 25 and the guides 52 and 53, respectively, are so related as to produce a moment on the can tending to tilt its longitudinal axis counterclockwise, as viewed in FIGS. 8, 9 and 10. In other words, the moment produced on the can by the guide 52 is greater than the oppositely directed moment produced by the guide 53. However, the differential between the moments is such that it will be overcome by the resistance of the lid to being sheared, which in itself applies a moment acting in the same direction as that applied by the guide 53.

Consequently, as the cutter wheel pierces the lid and the can is advanced to progressively shear the lid from the wall, the can axis will be tilted in a direction to lift the can guide 52 against the upper edge of its opening 55, while the opposite guide 53 will occupy the lower zone of its opening 56. The bottom edge of opening 56 is, however, sufficiently low that the guide will be spaced above it at all times during the cutting operation, thus assuring of constant pressure being applied by both guides to the rim of the can to keep it in engagement with the feed wheel. Clockwise tilting of the can axis is therefore limited by engagement of the can guide 52 with the upper edge of its opening 55, and counterclockwise tilting by engagement between the same guide and the lower edge of the opening 55. At no time when a can is engaged in the can opener and the cutter wheel and can feed wheel are in full overlapping relationship is it possible for the can guide 53 to either seat upwardly or downwardly in the opening 56 through which it extends.

From the foregoing it will be obvious that so long as the lid is being sheared from the can, the combined moment resulting from the resistance to shearing and the pressure applied by guides 52 and 53 is such that the switch actuating rocker arm or lever 68 will occupy the solid line position shown in FIG. 7. Accordingly, so long as the can remains in the position shown in FIG. 9, the switch actuating lever or rocker arm 68 will maintain the switch plunger SP depressed and there is no need to hold down the switch button SB. At all times while the end is being sheared from a can the axes of the can guides 52 and 53 will be substantially parallel and in the same plane, although this plane is at an angle of approximately 5° from the horizontal as shown in FIG. 9.

After the lid 81 of the can has been completely severed (as shown in FIG. 10) the moment acting on the can due to resistance of the lid to shearing ceases. Accordingly, inasmuch as the moment produced by can guide 52 exceeds that produced by can guide 53, the can will be swung from the position shown in FIG. 9 (in which its axis is approximately 5° clockwise from the vertical) to the position shown in FIG. 10 (in which its axis is approximately 3° counterclockwise from the vertical). When the can is in the latter position (that is, the position shown in FIG. 10) the can guides 52 and 53, the can guide bell crank levers 61 and 62, and the switch actuating lever 68 will be in the broken line positions shown in FIG. 7. Accordingly, the switch plunger SP will return to its uppermost position, thus permitting the contact points of the switch S to open, thereby stopping the motor M. As previously noted, engagement of the can guide 52 with the bottom of the opening 55 through which it extends limits the counterclockwise swinging of the can to the position shown in FIG. 10.

It will be evident that the longitudinal axes of the can guides 52 and 53 during movement between the extreme angular positions of the can axis follow generally arcuate paths about the bell crank fulcrum points 64a and 65a. In order to insure that the moment arms between the respective guides 52 and 53, and the fulcrum point between the lower edge of the can rim and feed wheel (which shifts slightly as the can swings through its approximate 8° angle) the axes of the respective guides are disposed below the fulcrum points 64a and 65a a distance sufficient to insure of the necessary lateral or sidewise movement of the guides. In other words, the distance from point of engagement of the can guide 52 with the top of the rim or flange of the can to the point the under edge of the rim or flange of the can bears on the periphery of the can feed wheel 25 remains substantially the same as the can is swung from one extreme position to the other extreme position. Inasmuch as this is equally true of the right hand can guide 53 and its similar cooperating parts, it will be seen that the net moment exerted by the can guides is essentially constant throughout the total angular displacement of the can.

After the end has been completely severed from the can and the motor has been automatically stopped, as described above, the can opener will continue holding the can until the user again fully depresses the can release lever 28 to again rotate the tilting head 21 to its clockwise or raised position. The cutter wheel and feed wheel are thereby separated sufficiently to permit removal of the can.

Should for any reason a can become stalled in the can opener (for example, as might be caused by an exceptionally severe dent in the rim or flange), the user need merely to depress the can release lever 28 which will not only permit prompt removal of the can from the can opener, but which will also result in automatic shut-off of the motor. Raising of the tilting head permits the can guides to assume their normal position which corresponds with the open position for the switch.

Although it is not necessary for the user to continue holding the switch button SB depressed after the end of the can has been fully pierced by the cutter wheel to cause the motor to continue operating, it should be noted that the user could, should he so elect, continue manual depression without damaging the automatic control means.

The manner of mounting the cutter wheel on the head insures that it can be removed and cleaned with ease and facility and returned to the unit without affecting the tolerances which exist between it and the feed wheel. Removal is accomplished by simply sliding the retainer 49 upwardly until its bifurcated ends are free of the grooves of the pins 48, whereupon the mounting plate can be withdrawn forwardly past the pins and the can guides.

Figure 11:
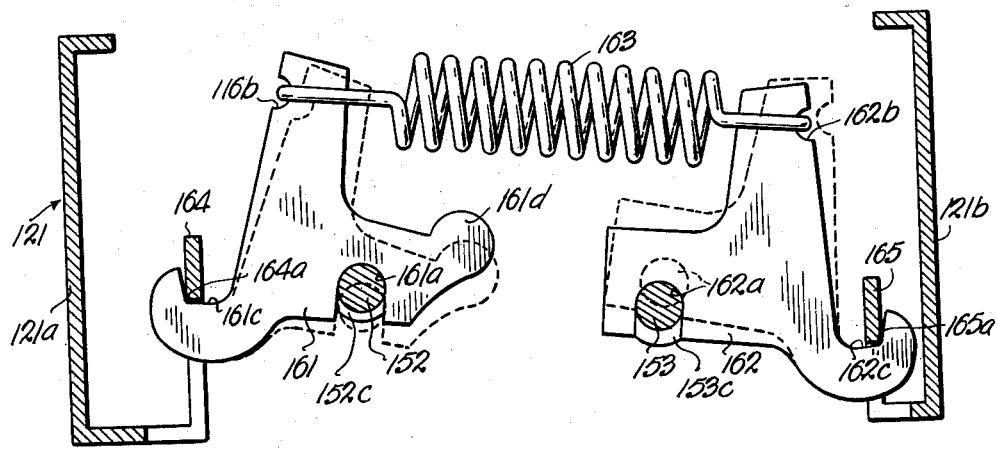
FIG. 11 is a view similar to FIG. 7, but illustrating a modified guide biasing arrangement in accordance with the invention.
Figure 13:
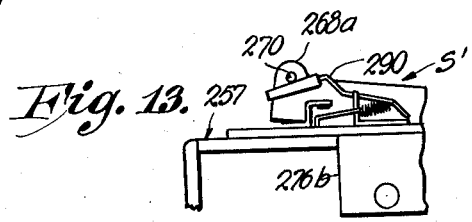
FIG. 13 is a fragmentary rear view of the structure disclosed in FIG. 12 illustrating principally the mounting and relationship of the control switch with the mechanism of FIG. 12.
Figure 12:
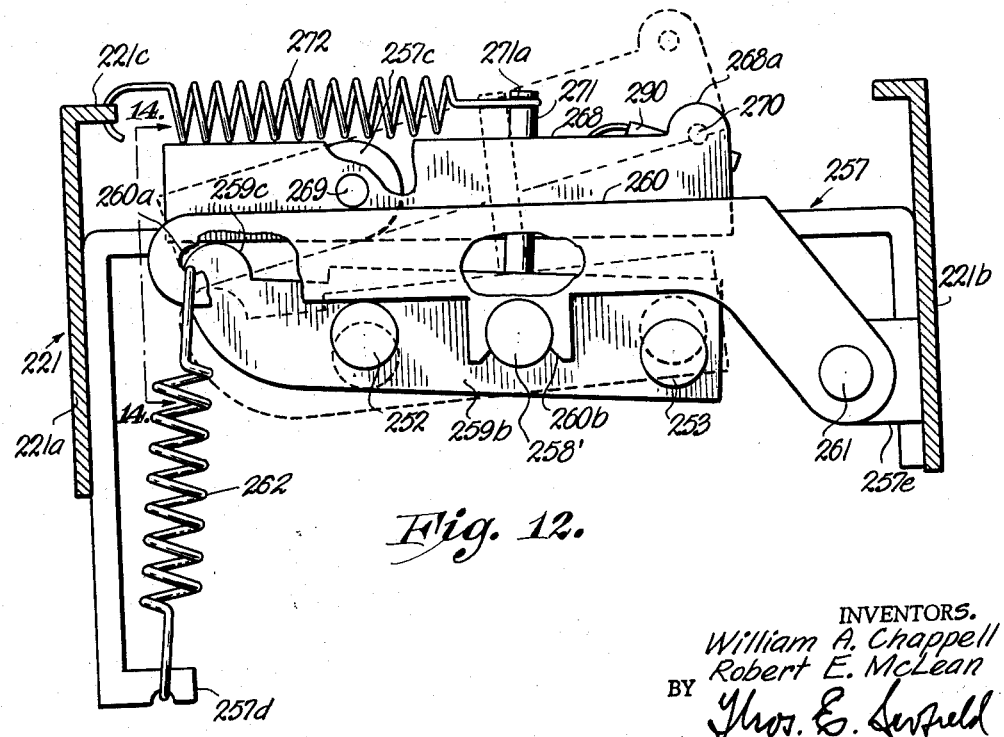
FIG. 12 is a view similar to FIGS. 7 and 11, but showing a still further modification of the guide members and biasing mechanism therefor.

In FIG. 11, which is a view similar to FIG. 7, we have illustrated a modified construction for the bell crank type can guide pivot arms. It will be understood that this modified construction can be employed with the can opener components previously described. In the modified construction exemplified in FIG. 11, the numeral 121 designates the tilting head, the numeral 152 designates the left-hand can guide, the numeral 153 designates the right-hand can guide, the numerals 152c and 153c designate grooves corresponding to grooves 52c and 53c of FIG. 7, the numerals 161a and 162a designate, respectively, the bifurcated portions of the left and right can guide pivot arms 161 and 162, the numeral 161c designates the obtuse fulcrum angle of the left can guide pivot arm, the numeral 162c designates the obtuse fulcrum angle of the right can guide pivot arm, the numerals 161b and 162b indicate respectively the notches for the spring, and the numeral 163 indicates the spring. The mounting brackets 164 and 165 are in this case turned upwardly with the pivot arms 161 and 162 fulcrumed thereto on corners 164a and 165a.

In the construction of FIG. 11, the fulcrum points for the left and right pivot arms 161 and 162 are substantially located so that they lie in a common plane with the undersides of the left and right can guides when the latter are seated downwardly on the rim or flange of a can and in the position they assume during the shearing of the end from the can. Although the axes of the can guides 152 and 153, as they swing in their arcs of operation, do not shift sidewise as in the previous embodiment, nevertheless, this modification has the advantage that the friction between the can guides and the rim of the can does not serve to impose turning moments on the pivot arms. While not shown in FIG. 11, it will be understood that, as in the previous embodiment, the end 161d of the left pivot arm will cooperate with and operate a rocker arm similar to rocker arm 68 of FIG. 7. In all respects the operation of the modified unit is the same as that previously described and it is therefore believed that further explanation is unnecessary.

In FIGS. 12-15, inclusive, we have shown a second alternate construction for the can guides and automatic switch control means. However, like the can guides and automatic switch control means shown in one construction in FIG. 7, and in a first alternate construction in FIG. 11, this second alternate construction provides for swinging of a can engaged in the can opener so that in one extreme position the axis thereof will be rotated approximately 5° clockwise from the vertical, and in the other extreme position, the axis thereof will be rotated approximately 3° counterclockwise from the vertical. Like the can guides of the first alternate construction as shown in FIG. 11, the axes of the can guides of this second alternate construction do not have the substantial sidewise shift during swinging of the can between its limits. It will be understood that the forward portions of the two can guides extend forwardly through openings in the front wall portion of the tilting head 221 that are like the openings provided in the front wall portion of the tilting head 21 of the preferred embodiment.

The numeral 257 generally designates a switch mounting bracket which spans the width of the tilting head and is secured to the respective sides 221a and 221b thereof. Instead of a plunger switch, we employ in this embodiment an over-center, on-off switch S' which is secured to the top of the bracket 257 by any suitable means. Contact points of the switch S' are biased to the open position. Accordingly, whenever downward force is applied to the arm 290 of switch S', the operating arm will be depressed, the contact points of the switch will close and the motor, which is in series with the switch S', will be energized.

The switch mounting bracket 257 is provided with a rearwardly located depending flange 257b on the front of which is secured a forwardly extending trunnion pin 258. The trunnion 258 is provided with an annular groove in which seats a corresponding semi-circular bearing notch formed in the downturned rearward ear 259a of a can guide swivel member 259. The main body of the can guide swivel member 259 extends forward substantially parallel with, but spaced below, the horizontal portion of the bracket 257 and terminates at its forward end in the downturned portion 259b. A second trunnion 258', substantially coaxial with trunnion 258, is anchored to and projects forwardly from portion 259b. As will be evident, the interconnection between the ear 259a and trunnion 258 is such that the swivel member 259 is restrained against fore and aft movement while still being free to pivot on the trunnion.

As shown, the forwardly projecting can guides 252 and 253 are, in this instance, secured to and made integral with the swivel member 259, being secured to the forward downturned portion 259b in any suitable fashion as by screws or hot heading. Rather than having the reduced diameter forward portions as in the previous embodiments, the right guide 253 is provided with a peripheral extension forming a chamfered surface 253a for engaging the rim of the can during operation and stabilizing the can for rotation in response to the feed wheel about its own longitudinal axis.

As in the previous embodiment, the can guides 252 and 253 extend through suitable openings in the forward wall of the tilting head and seat against the lower edges of these openings when the unit is not in use. Downward pressure is applied to the can guides to maintain them normally in contact with said edges through the medium of a cross lever 260. The lever is pivoted at its right end, as viewed in FIG. 12, to an inturned ear 257c formed on the bracket 257, and extends across the guides 252 and 253 in a plane just forwardly of the forward portion 259b of the swivel member. The pivot axis for the lever 260 is indicated at 261. The left-hand or distal end of lever 260 is provided with an aperture 260a which provides a connection for one end of a tension spring 262. The other end of spring 262 is anchored by a lug 257d which is preferably formed as a part of the bracket 257. The lower edge of lever 260 is provided with a substantially semicircular notch-type bearing approximately at the midpoint of its length, designated by reference numeral 260b. This bearing portion seats downwardly in the groove of the forward trunnion 258'. The axis of each of the can guides 252 and 253 is preferably equidistant from the axis of the trunnion 258', although this is not absolutely required. It will be evident that the tension imposed by spring 262, and acting on the lever 260, will serve to maintain a continuous force on the forward end of the swivel member tending to seat the can guides 252 and 253 in the bottom of the openings through which they extend. The forwardly located downwardly extending portion 259b of the swivel member is provided at its left end (as viewed in FIG. 12) with a substantially semicircular camming portion 259c. Overlying this camming portion 259c and for cooperation therewith is the left end of the switch actuating lever 268 which is freely pivoted on the shoulder rivet 269, which in turn is anchored in an upstanding ear 257e formed as a part of the bracket 257. The right end of the actuating lever 268 carries a rearwardly extending relatively long pin 270 which overlies and is operable to depress the operating member 290 of the switch S'.

Anchored in the top portion of the can guide swivel member 259 is a lower end of an upstanding shoulder rivet 271 which is provided with a groove 271a at its upper end. Engaged in groove 271a is one end of a second tension spring 272. The other end of spring 272 is suitably anchored to a lug 221c integral with the tilting head 221. The lever 268 is provided with an upward extension 268a which, in the complete unit, is disposed in operating relationship with the switch button SB previously described.

The manner of operation of the second alternate construction for the control means, illustrated in FIGS. 12-15, inclusive, is substantially as follows. When a can is not engaged in the can opener, the can guides 252 and 253 will be seated downwardly in the openings provided in the front wall portion of the tilting head 221, and through which the can guides extend as in the previous embodiment.

The spring 262 urges the free end of the cross lever 260 downwardly at all times. However, as previously explained, downward swinging of this lever is limited by engagement of the two can guides with the bottom edges of their openings. The spring 262 is of proper tension to assure that the amount of downward pressure by the can guides 252 and 253 on the rim or flange of a can engaged in the can opener is sufficient to provide positive traction between the teeth of the can feed wheel and the under edge of the rim or flange of the can.

When the end of a can engaged in the can opener has been fully pierced by the cutter wheel, the can guides 252 and 253 will be unseated from the bottom of the openings, and the can guides will assume relative positions similar to those shown in FIG. 9. In other words, the tension in spring 272 is sufficiently low that the moment exerted on the can tending to tilt its longitudinal axis from the vertical, and caused by resistance to shearing, will overcome the spring and cause the swivel member 259 to tilt clockwise to the solid line position shown in FIG. 12. So long as the end is being sheared from the can, the combined downward pressure of the right-hand can guide 253 and that of the cutter wheel (at point of shearing) exceeds the downward pressure of the left can guide 252, and accordingly, until the end has been completely sheared from the can, the net moment exerted on the can will maintain the can guide swivel member and the can in their extreme clockwise positions. The trunnions 258 and 258' are so oriented with respect to one another that whenever the parts are substantially in the solid line position of FIG. 12 (the running position), they are in coaxial alignment.

In the operation of opening a can it will be observed that depressing of the switch button (not shown, but substantially the same as the switch button SB, FIG. 2) will cause it to engage the upward extension 268a, thereby depressing the right end of the actuating lever 268, and through displacement of pin 270, closing the contact points of the switch S'. This will cause the motor M to operate. As soon as the end of the engaged can has been fully pierced by the cutter wheel, the can guide swivel member 259 will be rotated clockwise on its trunnions by the forces described above until the can guides 252 and 253 assume positions corresponding to those of the can guides 52 and 53, respectively, shown in FIG. 9 and in the solid lines of FIG. 12. While the can guide unit is in its fully clockwise position of rotation, the semicircular portion 259c will be in its uppermost position, in which position, through engagement with the under edge of the left end of the switch actuating lever 268, it maintains the right end of the lever 268 in its switch depressing position. As soon as the end has been completely severed from the can, and resistance to shearing has ceased, spring 272 will serve to return the swivel member 259 to the broken line position and rotate the can to the position shown in FIG. 10. The counterclockwise rotation of the swivel member disengages the upward holding force from the left end of lever 268, permitting the right end of the lever 268 to return to its uppermost position and permitting the contact points of the switch S' to open and thereby deenergize the motor.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings, is to be interpreted as illustrative and not in a limiting sense.

Having thus described our invention, we claim:

1. In a power operated can opener for severing the end from a can, the combination of a feed wheel mounted for rotation about a substantially fixed axis, a pivotal head member supported for pivotal movement about an axis transverse to said fixed axis and having a portion thereof located for movement laterally toward and away from said feed wheel axis, a cutter member carried by said head portion and adapted to cooperate with said feed wheel, said head member having a first position in which the cutter member is in nonshearing relationship with the feed wheel and a second position in which the cutter member is in shearing relationship with the feed wheel, power means drivingly connected with said feed wheel for rotating same, and cooperating can piercing means connected respectively with said head member and said power means and operable to pivot said head member into said second position under the influence of said power means within the first revolution of the feed wheel following energization of the power means.

2. The combination as in claim 1 including means operable responsive to pivoting of said head member into said second position to releasably maintain said head member in said second position and to maintain it in said second position independently of said can piercing means.

3. The combination as in claim 2 including can guide members carried by said head member and operable to seat downwardly on the end flange of a can engaged by said feed wheel on opposite sides of the feed wheel when the head member is in said second position, and guide biasing means connected with said guide members and resiliently biasing same downwardly whereby to apply a predetermined downward force component on the can flange when the head is in said second position.

4. The combination as in claim 3 including power control mechanism operatively connected with said power means, and wherein said guide members and biasing means are constructed to cause the guide members to apply a torque to the can tending to tilt the axis of the can relative the feed wheel in the opposite direction from the torque caused by resistance of the can end to shearing by said cutting member, said first torque being less than the second torque whereupon the can axis will be displaced when resistance to shearing ceases, and including means responsive to the displacement of said guides for governing said power control mechanism.

5. In a power operated can opener for severing the end from a can, the combination of a support body, a fore and aft feed wheel shaft rotatably supported by said body, a feed wheel secured to the forward end of said shaft for rotation therewith, a can piercing cam connected with said shaft for rotation therewith, said cam spaced rearwardly of said feed wheel and having an eccentric camming surface, a tilting head overlying said shaft and mounted for swinging movement about an axis transverse to the axis of said shaft and located spatially between said feed wheel and cam, a cutter member mounted on the forward end of said head, and means carried by said head and operable to be positioned in the rotational path of said camming surface whereby to cause head head to be urged toward a position in which said cutter wheel is in shearing relationship with said feed wheel.

6. The combination as in claim 5 including means for releasably maintaining said head in the position to which it is urged by said camming surface.

7. The combination as in claim 5 including manually operable mechanism for displacing said last mentioned means from the rotational path of the camming surface whereby to permit swinging of the head from said position at any angular position of the cam.

8. In a power operated can opener for severing the end from a can, the combination of a support body, an electric motor carried by the body, an on-off switch for said motor normally biased to the off position, a fore and aft feed wheel shaft rotatably supported by said body, a feed wheel secured to the forward end of said shaft for rotation therewith, means drivingly connecting said motor with said shaft, a tilting head overlying said shaft and supported on said body for rocking movement about an axis transverse to the axis of said shaft and spaced rearwardly of said feed wheel, a cutter member mounted on the forward portion of said head, said head movable between a shearing position in which said cutter member is in end shearing relationship with said feed wheel and a nonshearing position where the cutter member is spaced sufficiently from the feed wheel to permit positioning of the end of a can beneath and in contact with the cutting member, head rocking means for rocking said head to said nonshearing position, can piercing means operable to couple said shaft with said head and cause the head to rock toward the shearing position within the first revolution of said shaft following shifting of the switch to the on condition, and switch control means carried by said head for sensing the condition of the end of the can and operable to maintain said switch in the on condition so long as the cutter member continues to shear the end from the can but to permit the switch member to return to the off condition when shearing has been completed.

9. The combination as in claim 8 wherein said piercing means includes a camming member rotatable with said shaft and a cooperating follower member connected with said head.

10. The combination as in claim 9 including means for disengaging said follower member from said camming means upon actuation of said means for rocking the head toward a nonshearing position.

11. The combination as in claim 8 including means actuated responsive to movement of the head into the shearing position to releasably maintain the head in said position independently of the can piercing means.

12. The combination as in claim 11 including means connected with and actuated by said head rocking means to render ineffective said last mentioned means upon the actuation of said head rocking means.

13. In an automatic power operated can opener, the combination of a feed wheel, a cutter member adapted for movement between cutting and noncutting positions relative to the feed wheel, a pair of movable spaced can guide members located respectively on opposite sides of the feed wheel and engaging and resiliently biasing the end flange of a can into tractive engagement with said feed wheel when the cutter is in cutting position, a motor drivingly connected with said feed wheel, means operable, upon energization of said motor, to move said cutter member into said cutting position, the resilient bias of the respective guide members being such that a torque is imposed on the can by the guide members tending to tilt the can axis in a direction opposite from that which the can is tilted by resistance to cutting, the torque imposed by the guide members being less than that caused by resistance to cutting whereby the can will be shifted and the guides displaced at completion of cutting, and motor control means actuated by said guide members and operable to maintain said motor energized during cutting but to cause deenergization as cutting is completed.

14. The combination as in claim 13 wherein said guide members are biased downwardly by cooperating individual pivoted bell crank members having guide engaging ends and free ends, the free ends connected with one another by resiliently yieldable means.

15. The combination as in claim 14 wherein the pivots for the bell crank members are so located as to cause the guides to shift during tilting of the can to maintain the distances from the zone of engagement of the can flange with the feed wheel to the points of engagement of the respective guide members with the flange substantially the same as the can axis changes position.

16. The combination as in claim 14 wherein said guide members are connected to and with one another by a pivotal swivel member, and including resilient biasing means connected with said swivel member operable to impose a downward force and pivot moment thereon operable to produce said torque on the can opposite from the torque resulting from cutting.

17. In an automatic power operated can opener, the combination of a feed wheel, a cutter member adapted for movement between cutting and noncutting positions relative to the feed wheel, a pair of movable spaced can guide members located respectively on opposite sides of the feed wheel and engaging and resiliently biasing the end flange of a can into tractive engagement with said feed wheel when the cutter is in cutting position, a motor drivingly connected with said feed wheel, means operable to move said cutter member into said cutting position, the resilient bias of the respective guide members being such that a torque is imposed on the can by the guide members tending to tilt the can axis in a direction opposite from that which the can is tilted by resistance to cutting, the torque imposed by the guide members being less than that caused by resistance to cutting whereby the can will be shifted and the guides displaced at completion of cutting, and motor control means actuated by said guide members and operable to maintain said motor energized during cutting but to cause deenergization as cutting is completed.

18. In an automatic power operated can opener for severing the end from a can having an end flange, the combination of a feed wheel mounted for rotation about a fixed axis, a movable head member supported for movement of a portion thereof transversely toward and away from said feed wheel axis, a cutter member carried by said portion of said head member and positioned to engage and pierce the end of a can when the flange thereof is seated on said feed wheel as the head portion is moved toward said feed wheel axis, a motor drivingly connected with said feed wheel, switch means for said motor, and switch control means carried by said head member and including movable members operable to engage and impose a torque on said can opposite to and of lesser value than the torque caused by resistance to cutting, said control means actuated by shifting of said members in response to completion of cutting to cause said switch means to deenergize said motor.

19. In a power operated can opener, the combination of a feed wheel mounted for rotation about a fixed axis, a movable head member supported for movement of a portion thereof transversely toward and away from said feed wheel axis, a cutter mounting plate secured to said portion at spaced points whereby to provide a section of said plate between said points which is free to flex relative said head portion, and a cutter member connected with and supported on said section of said mounting plate, said cutter member positioned to be moved into cooperating overlapping cutting relationship with said feed wheel in response to movement of said head member portion toward said feed wheel axis.

20. The combination as in claim 19 wherein said plate is secured to said portion by pins extending from said portion and through registering apertures in said plate, and including releasable fastener means cooperating with the pins to maintain the plate thereon.

References Cited in the file of this patent

UNITED STATES PATENTS

| | | |
|---|---|---|
| 2,789,345 | Klessen | Apr. 23, 1937 |
| 2,979,815 | Rohde et al. | Apr. 18, 1961 |